(No Model.)
R. W. ANDREWS.
FISHING ROD.
No. 324,450. Patented Aug. 18, 1885.
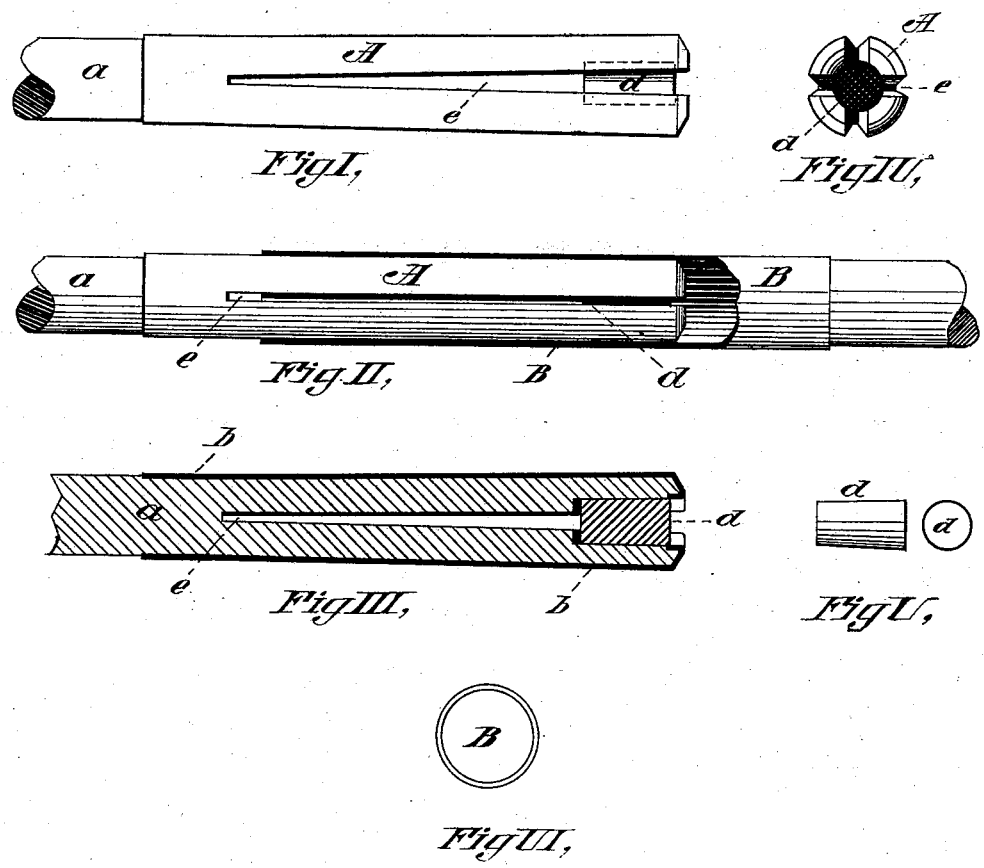
Witnesses,
E. F. Ramsay
J. S. Crooks
Inventor:
R. W. Andrews,
by R. F. Hyde,
Atty.

UNITED STATES PATENT OFFICE.

ROBERT W. ANDREWS, OF STAFFORDVILLE, CONNECTICUT.

FISHING-ROD.

SPECIFICATION forming part of Letters Patent No. 324,450, dated August 18, 1885.

Application filed June 6, 1884. (No model.)

*To all whom it may concern:*

Be it known that I, ROBERT W. ANDREWS, a citizen of the United States, residing at Staffordville, in the county of Tolland and State of Connecticut, have invented a new and useful Improvement in Joints for Fishing-Rods, of which the following is a specification.

This invention is fully illustrated in the accompanying drawings, in which Figure I is a side view of one of the sections of my joint. Fig. II is a partial sectional view of the complete joint. Fig. III is a longitudinal section of Fig. I. Fig. IV is an end view of the same. Fig. V is a detail view, and Fig. VI is a cross-section of the sleeve-socket.

A is that part of the joint received into the cylindrical socket B in joining the ends of two sections of the rod. The part A of the joint has two or more cuts or kerfs radiating from the axis of the rod and extending longitudinally from the outside of the end, to leave two or more elastic sections compressible from their free ends in the direction of the axis of the rod, in their normal position forming an approximate cylinder of greater diameter than the socket forming the corresponding part of the joint; and the invention consists in the combination and construction, as hereinafter described, and more particularly pointed out in the claims.

*a* is the stock of a bamboo or other rod, reenforced by a metallic covering, *b*. The covering *b* extends over the end of the part A, and has its edge upset, as seen in Figs. III and IV, so as not only to form a covering to the end of the ferrule, but to also form an inner covering to the mouth of a socket for containing an elastic plug, *d*. Two or more kerfs, *e*, extending to the end of part A, and radiating from its axis, are formed as shown, and from the end a counterbore is formed to receive a plug, *d*, preferably of rubber, which, when in place, leaves the perimeter of part A of greater diameter than the corresponding socket, B. It will be seen that when the part A is forced into the socket the segments of the ferrule, made elastic by the rubber, exert a constant pressure over their entire outer surface upon the inner wall of the socket B.

To facilitate the introduction of the part A into the socket, I prefer to bevel the corners of the end, as shown; also, to cause the compressed ferrule-sections to bear upon all of the interior of the socket, I prefer to cause the kerfs *e* to extend outside of the socket B, as seen in Fig. II.

In the drawings four kerfs, *e*, are shown as leaving space in the ferrule for contraction; but in the smaller joints of a rod three, or even two, may be sufficient.

Now, having described my invention, what I claim is—

1. The within-described improved joint for fishing-rods, consisting of a cylindrical wooden stock, *a*, and a metallic covering, *b*, combined and slotted, as set forth, and an elastic plug, *d*, all arranged, substantially as shown and described, to form a compressible ferrule, in combination with a corresponding socket of smaller diameter, and adapted to compress the movable sections of said ferrule upon their plug when combined therewith.

2. In a fishing-rod joint, a ferrule formed of a cylindrical wooden stock, *a*, and a metallic covering, *b*, prolonged and upset to form a lining to a counterbore within the end of said stock, both stock and cover being slotted, and a rubber plug, *d*, arranged within said metal-lined counterbore, in combination with a corresponding socket of smaller diameter, and adapted, as described, to compress said ferrule-sections upon the plug.

ROBERT W. ANDREWS.

Witnesses:
A. HOWARD,
JULIUS CONVERSE.